United States Patent [19]
Dschaak

[11] Patent Number: 5,620,193
[45] Date of Patent: Apr. 15, 1997

[54] GAME HAULING CART

[76] Inventor: Jimmy L. Dschaak, 410 Woodbury Dr., Craig, Colo. 81625

[21] Appl. No.: 565,963

[22] Filed: Dec. 4, 1995

[51] Int. Cl.⁶ .................................................. B62B 1/14
[52] U.S. Cl. ............................................... 280/47.31
[58] Field of Search .......................... 280/47.3, 47.31, 280/19, 652, 653, 659; 212/180; 414/462; 254/3 R, 3 C

[56]       References Cited
U.S. PATENT DOCUMENTS

| 2,918,296 | 12/1959 | Goodale | 280/47.3 |
| 2,979,338 | 4/1961 | Burger | 280/47.3 |
| 2,992,834 | 7/1961 | Tidwell et al. | 280/47.3 |
| 3,820,807 | 6/1974 | Curran | 280/47.3 |
| 3,907,323 | 9/1975 | Knapp et al. | 280/47.3 |

Primary Examiner—Richard M. Camby

[57]       ABSTRACT

A game hauling cart including a frame that has a first side portion, a second side portion, and a middle portion. The first side portion of the frame has a pair of handles with a first flat bar. The second side portion has a second pair of handles with a second flat bar. The middle portion has three flat bars proportionately spaced and forming a frame base. A wheel is rotatably mounted on a shaft portion. Included are a pair uprights with each upright having a wheel end and a frame end. The wheel end of each upright receives the shaft. The frame end of each upright is welded to a lower side of one of the flat bars of the frame base. A pair of braces are provided. Each brace has a bottom end welded to one of the uprights and a pair of arms that extend upward. Each of the arms are welded to the lower side of one of the three flat bars. A rigid mesh is included and positioned within the frame. Lastly, a wench is attached to one of the flat bars between the handles.

9 Claims, 3 Drawing Sheets

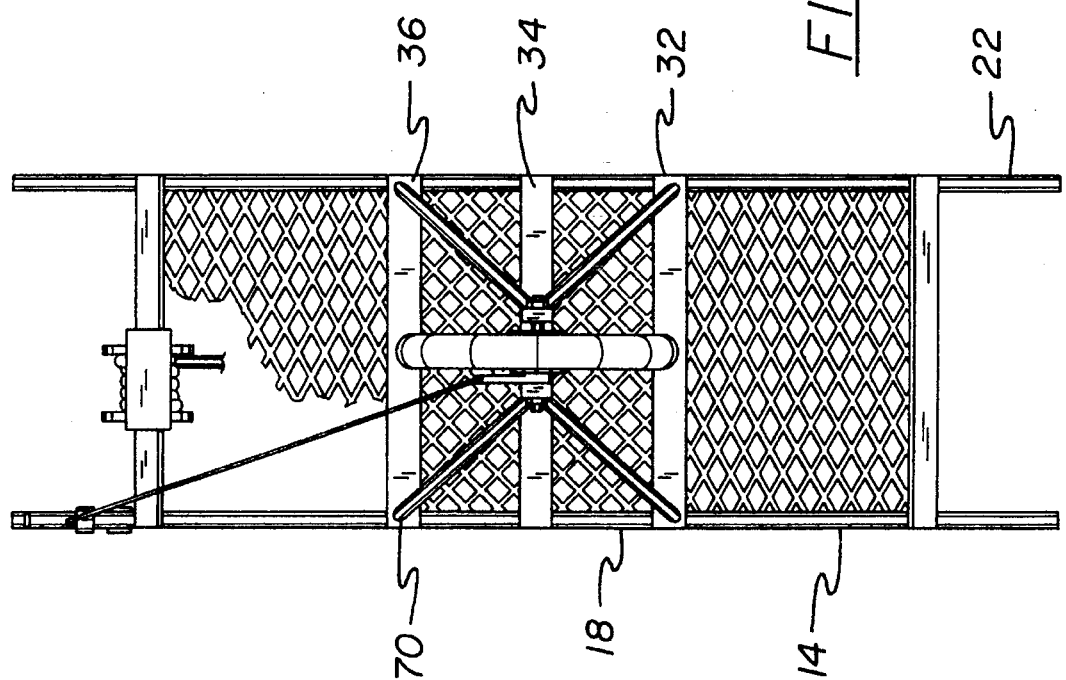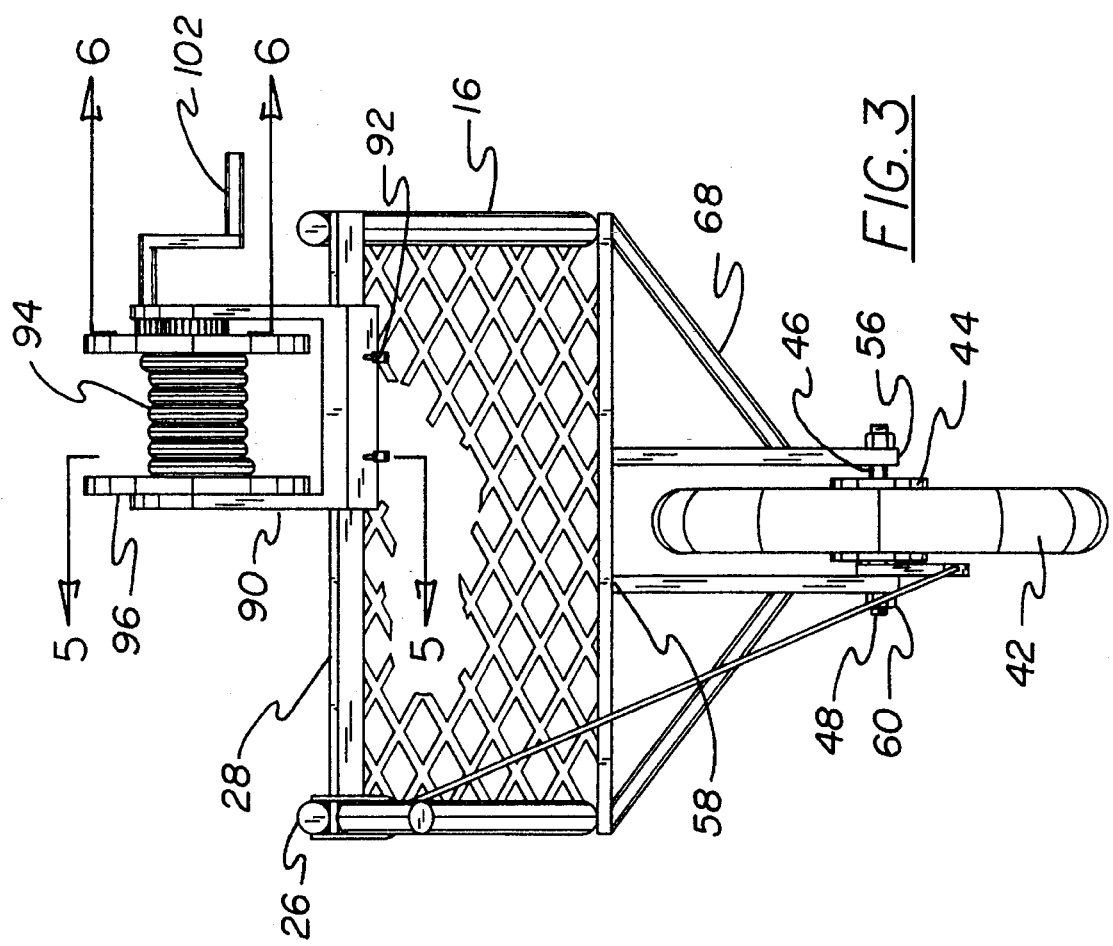

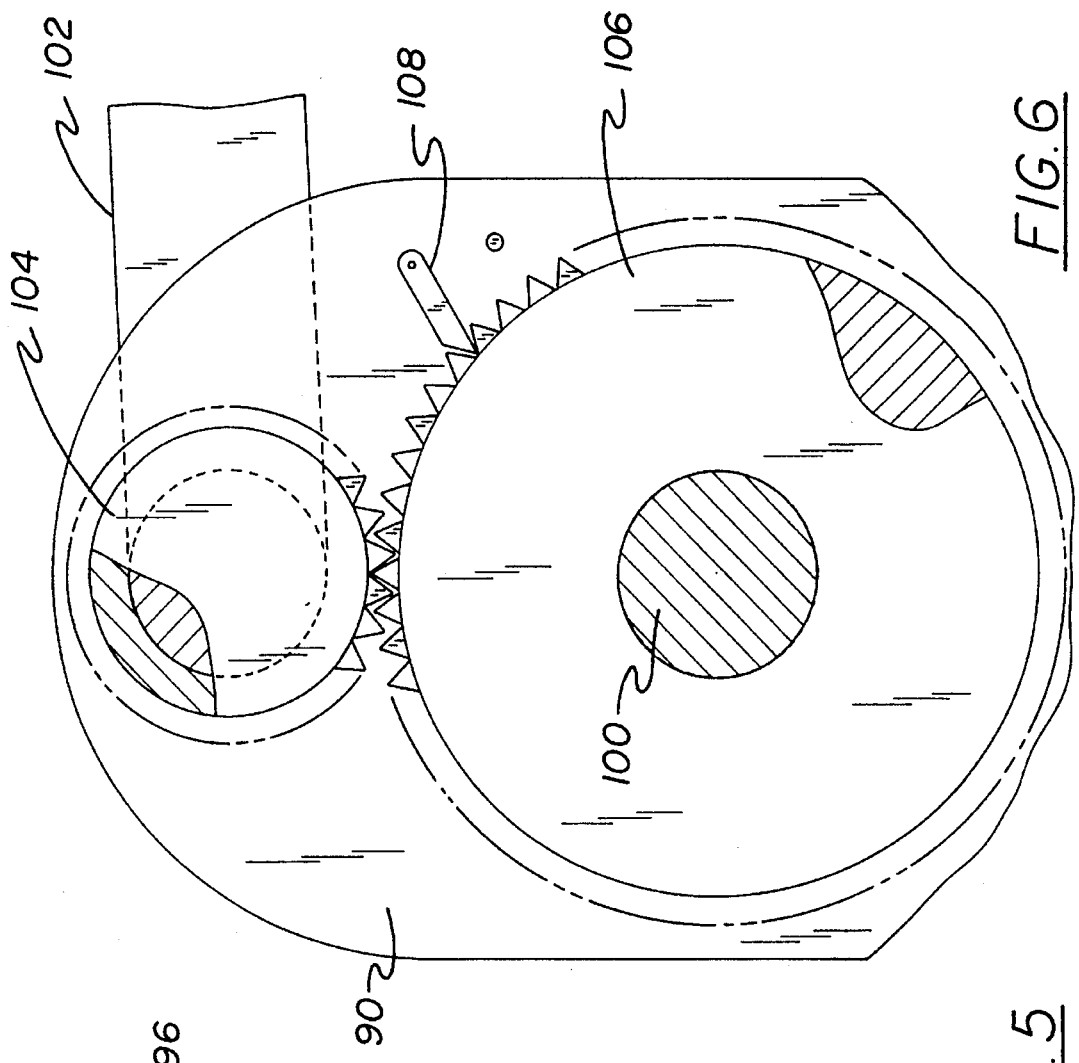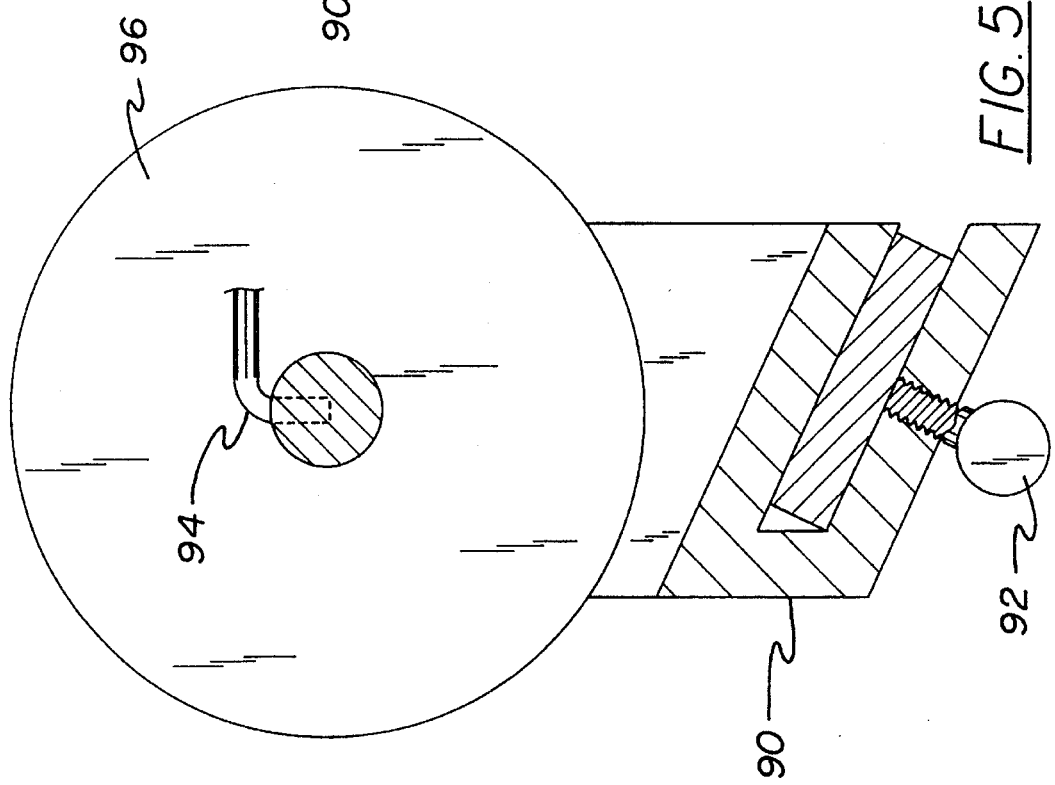

GAME HAULING CART

BACKGROUND OF THE INVENTION

1. Field of the Invention

The present invention relates to a game hauling cart and more particularly pertains to allowing game to be pulled into a symmetrical cart structure by a wench, and further allowing the structure to be supported by a bi-directional single wheel.

2. Description of the Prior Art

The use of a game carrying device is known in the prior art. More specifically, a game carrying device heretofore devised and utilized for the purpose of transporting game carcass are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,328,192 to Thompson discloses a manual pull-type carrier for transporting a large game carcass. U.S. Pat. No. 5,282,520 to Walker discloses a portable hunting stand and game carrier. U.S. Pat. No. Design 341,011 to Liberato discloses a game carrying device. U.S. Pat. No. 5,242,030 to Lobocco discloses a deer stand. U.S. Pat. No. Design. 315,447 to McMahon discloses a small game carrier. Lastly, U.S. Pat. No. 4,023,844 to Roberts discloses a large game carrier.

While these devices fulfill their respective, particular objectives and requirements, the aforementioned patents do not describe a game hauling cart that allows a game carcass to be secured with the J-hook of a wench, pulled by the wench into the carriage of the cart, and transported out of the wilderness in the carrier supported by a bi-directional single wheel.

In this respect, the game hauling cart according to the present invention substantially departs from the conventional concepts and designs of the prior art, and in doing so provides an apparatus primarily developed for the purpose of allowing game to be pulled into a symmetrical cart structure by a wench, and further allowing the structure to be supported by a bi-directional single wheel.

Therefore, it can be appreciated that there exists a continuing need for a new and improved game hauling cart which can be used for allowing game to be pulled into a symmetrical cart structure by a wench, and further allowing the structure to be supported by a bi-directional single wheel. In this regard, the present invention substantially fulfills this need.

SUMMARY OF THE INVENTION

In view of the foregoing disadvantages inherent in the known types of a game carrying device now present in the prior art, the present invention provides an improved game hauling cart. As such, the general purpose of the present invention, which will be described subsequently in greater detail, is to provide a new and improved game hauling cart and method which has all the advantages of the prior art and none of the disadvantages.

To attain this, the present invention essentially comprises a generally U-shaped frame. The frame has a first side portion, a second side portion, and a middle portion. The first side portion of the frame has a first pair of handles with a first flat bar therebetween. The second side portion has a second pair of handles with a second flat bar therebetween. The middle portion is in a horizontal plane below the first and second portions. The middle portion has three flat bars that are proportionately spaced and form a frame base. Included is a wheel that is rotatably mounted on a hub body by a shaft portion. The shaft is positioned within the hub body of the wheel and has a pair of threaded ends. Also, a pair vertical uprights are provided. Each upright has a wheel end and a frame end. The wheel end of each upright is capable of receiving one of the threaded ends of the shaft. The shaft is locked within each wheel end by a hex nut. The frame end of each upright is welded to a lower side of a central flat upper middle portion of the frame. Each upright allows the wheel to support the frame above a receiving surface for movement along the receiving surface. Additionally, a pair of V-shaped braces are included. Each brace has a bottom end with a pair of arms that extend upward. The bottom end of each brace is welded to one of the pair of uprights. Each arm has a top end that is welded to the lower side of one of the three flat bars. The one flat bar has at the top end welded thereto and spaced from the central flat bar. The V-shaped braces add support for the wheel supporting the frame. A rigid mesh is provided. The mesh is positioned within the frame and welded to the first side portion, the second side portion, and the frame base. The mesh is welded along an upper side of the frame. The mesh, when welded to the frame, is capable of transforming the frame into a symmetrical carriage structure. Included is a hand brake mechanism. The hand brake mechanism is attached to one of the handles of the frame and has a brake cable extending downwardly toward a catch device. The catch device is coupled to the shaft of the wheel between one of the uprights and the hub body. The hand brake mechanism is capable of stopping the rotation of the wheel. Lastly, a wench is attached to one of the flat bars between the handles. The wench has a cable that is wrapped around a wench drum. The cable has a J-hook at an end. The J-hook allows game to be hauled into the carriage by the wench for transporting game out of the wilderness.

There has thus been outlined, rather broadly, the more important features of the invention in order hat the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved game hauling cart which has all of the advantages of the prior art a game carrying device and none of the disadvantages.

It is another object of the present invention to provide a new and improved game hauling cart which may be easily and efficiently manufactured and marketed.

It is further object of the present invention to provide a new and improved game hauling cart which is of durable and reliable constructions.

An even further object of the present invention is to provide a new and improved game hauling cart which is susceptible of a low cost of manufacture with regard to both materials and labor, and which accordingly is then susceptible of low prices of sale to the consuming public, thereby making such game hauling cart economically available to the buying public.

Still yet another object of the present invention is to provide a new and improved game hauling cart which provides in the apparatuses and methods of the prior art some of the advantages thereof, while simultaneously overcoming some of the disadvantages normally associated therewith.

Even still another object of the present invention is to provide a game hauling cart for allowing game to be pulled into a symmetrical cart structure by a wench, and further allowing the structure to be supported by a bi-directional single wheel.

Lastly, it is an object of the present invention to provide a new and improved game hauling cart including a frame that has a first side portion, a second side portion, and a middle portion. The first side portion of the frame has a pair of handles with a first flat bar. The second side portion has a second pair of handles with a second flat bar. The middle portion has three flat bars proportionately spaced and forming a frame base. Also, a wheel that is rotatably mounted on a shaft portion is included. Included are a pair uprights with each upright having a wheel end and a frame end. The wheel end of the each upright receives the shaft. The frame end of each upright is welded to a lower side of one of the flat bars of the frame base. A pair of braces are provided. Each brace has a bottom end welded to one of the uprights and a pair of arms that extend upward. Each of the arms is welded to the lower side of one of the three flat bars of the base frame. A rigid mesh is included and positioned within the frame. The mesh transforms the frame into a symmetrical carriage structure. Lastly, a wench is attached to one of the flat bars between the handles to allow game to be hauled into the carriage by the wench.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevational view of the present invention.

FIG. 4 is a rear plane view of the present invention of FIG. 1.

FIG. 5 is a cut-away sectional view of the wench taken along line 5—5 of FIG. 3.

FIG. 6 is a sectional view of the ratchet mechanism of the wench taken along line 6—6 of FIG. 3.

The same reference numerals refer to the same parts through the various figures.

DESCRIPTION OF THE PREFERRED EMBODIMENT

Figure 1:
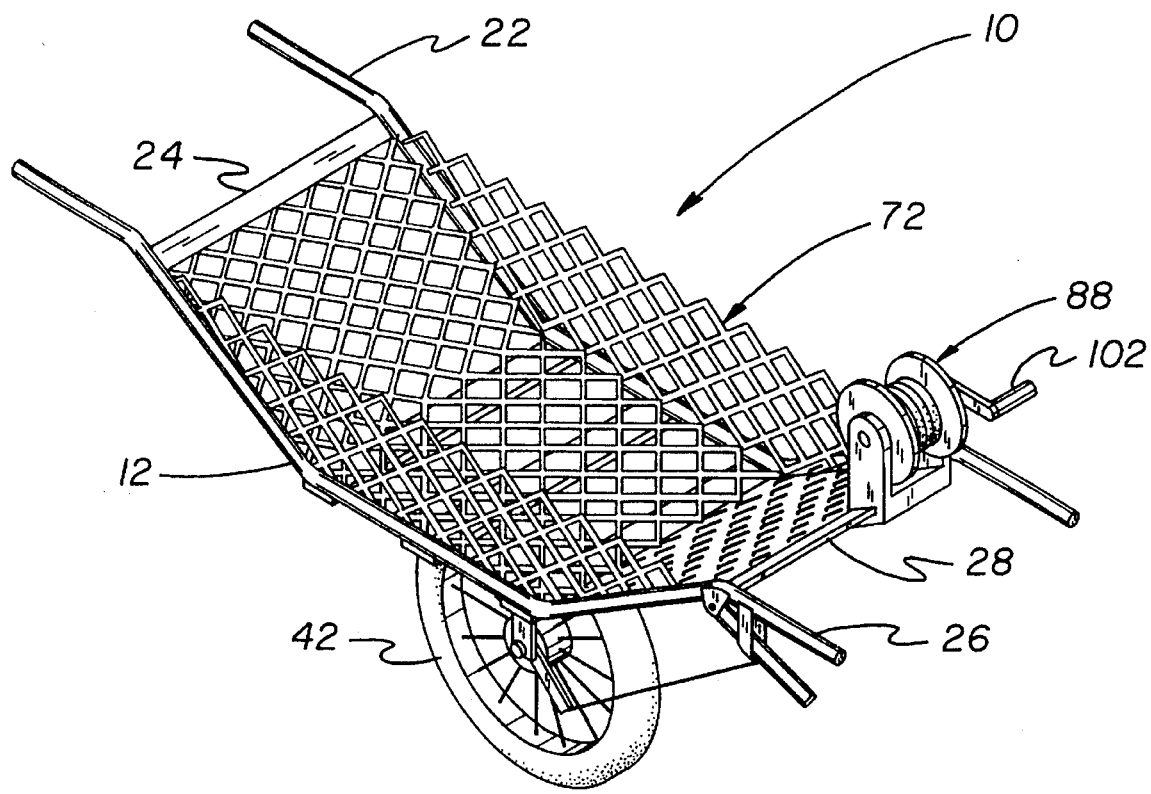
FIG. 1 is a perspective view of the preferred embodiment of the game hauling cart constructed in accordance with the principles of the present invention.

With reference now to the drawings, and in particular to FIG. 1 thereof, the preferred embodiment of the new and improved game hauling cart embodying the principles and concepts of the present invention and generally designated by the reference numeral 10 will be described.

The present invention, the game hauling cart 10 is comprised of a plurality of components. Such components in their broadest context include a carriage, a wheel, a wench, and a hand brake. Such components are individually configured and correlated with respect to each other so as to attain the desired objective.

Specifically, the present invention includes a generally U-shaped frame 12. The frame, as shown in FIG. 1, is formed of a rigid conduit. The frame has a first side portion 14, a second side portion 16, and a middle portion 18. The first side portion of the frame has a first pair of handles 22 that extend outwardly from the first side portion. The pair of handles have a first flat bar 24 that is fixedly positioned between the handles. The second side portion has a second pair of handles 26 that extend outwardly from the second side portion. The second pair of handles have a second flat bar that is fixedly positioned between the second handles. The middle portion is in a horizontal plane below the first and second portions.

As illustrated in FIG. 4, the middle portion has three flat bars 32, 34, 36 that are proportionately spaced and form a frame base. The flat bars between each handle and the flat bars of the frame's base are formed from iron. The frame has a length of eighty-eight and one-half inches from the tip of the first pair of handles to the tip of the second pair of handles. The frame has a width of about twenty-six and one-fourth inch.

As best illustrated in FIG. 3, a wheel 44 is provided. The wheel is rotatably mounted on a hub body 44 with a shaft portion 46 positioned therein. The shaft portion has a pair of threaded ends 48. The wheel is a tubeless and inflatable wheel. The wheel is capable of rotating in a forward or rearward direction as needed.

Figure 2:
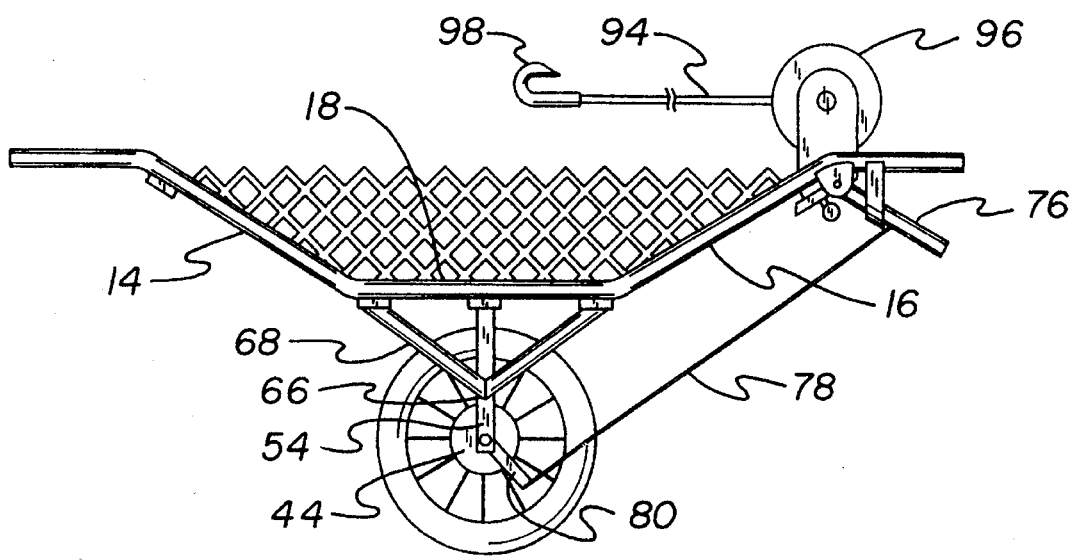
FIG. 2 is a side view of the present invention in an operable configuration.

Also, a pair vertical uprights 54 are included. Each upright has a wheel end 56 and a frame end 58. The uprights are formed of the same flat iron used to make the flat bars above. The wheel end of each upright receives one of the threaded ends 48 of the shaft 46 as shown in FIG. 3. The shaft is locked within each wheel end by a hex nut 60. The frame end of each upright is welded to a lower side of a central flat bar 34 of the middle portion 18 of the frame. As shown in FIG. 2, each upright allows the wheel to support the frame 12 above a receiving surface for movement along the receiving surface.

FIG. 4 shows that a pair of V-shaped braces 64 are provided. The braces are formed from an angled iron. Each brace has a bottom end 66 with a pair of arms 68 that extend upward from the bottom end. The bottom end of each brace is welded to one of the pair of uprights 54. Each arm has a top end 70 that is welded to the lower side of one of the three flat bars 32 or 36. The flat bars that have the top end of the arm are spaced from the central flat 34. The V-shaped braces add support to the wheel 44 as it supports the frame 12.

As best illustrated in FIG. 1, a rigid mesh 72 is positioned within the frame 12. The mesh is preferably an iron mesh that is commercially available. The mesh is welded to the first side portion 14, the second side portion, and the frame base 18 the upper side of the frame. The mesh, when welded to the frame, transforms the frame into a symmetrical carriage structure 10.

Additionally, a hand brake mechanism 76 is attached to one of the handles 26 of the frame 12. The hand brake mechanism has a brake cable 78 extending downwardly toward a catch device 80. The catch device, as shown in FIG. 4, is coupled to the shaft of the wheel between one of the uprights 54 and the hub body 44 of the wheel. The hand brake mechanism is capable of stopping the rotation of the wheel. The hand brake mechanism is activated and deactivated by pressing against a handle 82 of the device 76.

Lastly, a wench 88 is attached to one of the flat bars 28 between the handles 26 of the frame 12. The wench is coupled to the flat bar by a bracket 90 and a pair of thumb screws 92, as shown in FIG. 5. The wench has a cable 94 that is wrapped around a wench drum 96, as shown in FIG. 3. The cable has a J-hook 98 at an end. The cable is a steel cable and the J-hook is formed of the same material. The J-hook allows game carcass to be hauled into the carriage 10, by the wench, for transporting out of the wilderness.

Furthermore, the wench is rotated by a ratcheting motion. The ratcheting motion is provided by turning a crank handle 102 of the wench. The crank handle is attached to a round catch 104, as shown in FIG. 6. The catch engages a ratchet 106 that is positioned around a drum axle 100. As the crank handle is turned, the cable, having been pulled from around the drum, is rewound around the wench drum. A pawl 108 prevents movement of the ratchet mechanism.

The present invention provides an easy to use hauling cart for transporting game carcass out of the wilderness. The game hauling cart is structured to carry large carcass game of up to five hundred pounds. The cart is also designed to carry small carcass game or more than one carcass. The cart is designed to be pushed by one or more persons once the game carcass is in the carriage portion. The present invention also aids the hunter by providing a wench with a J-hook and cable. The hook can be either grappled onto the carcass or it can used to lock the cable when the cable is wrapped around the carcass, then the cable is pulled back to pull the carcass into the invention with the wench.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved game hauling cart for loading and transporting wild game comprising in combination:

a generally U-shaped frame having a first side portion, a second side portion and a middle portion, the first side portion of the frame having a first pair of handles extending therefrom with a first flat bar therebetween, the second side portion having a second pair of handles extending therefrom with a second flat bar therebetween, the middle portion being in a horizontal plane below the first and second portion, the middle portion having three flat bars proportionately space and forming a frame base;

a wheel being rotatably mounted on a hub body with a shaft portion being positioned within, the shaft portion having a pair of threaded ends;

a pair of vertical uprights with each upright having a wheel end and a frame end, the wheel end of each upright being capable of receiving one of the threaded ends of the shaft therethrough, the shaft being locked within each wheel end by a hex nut, the frame end of each upright being welded to a lower side of a central flat bar of the middle portion of the frame, each upright allowing the wheel to support the frame above a receiving surface for movement along the receiving surface;

a pair of V-shaped braces with each brace having a bottom end with a pair of arms extending upward therefrom, the bottom end of each brace being welded to one of the pair of uprights, each arm having a top end, the top end being welded to the lower side of one of the three flat bars, spaced from the central flat bar, of the middle portion of the frame, the V-shaped braces adding support for the wheel supporting the frame;

a rigid mesh being positionable within the frame, the mesh being welded to the first side portion, the second side portion and the frame base along an upper side of the frame, the mesh when welded to the frame and capable of transforming the frame into a symmetrical carriage structure;

a hand break mechanism being attached to one of the handles of the frame, the hand break mechanism having a break cable extending downwardly toward a catch device, the catch device being coupled to the shaft of the wheel between one of the uprights and the hub body of the wheel, the hand break mechanism being capable stopping the rotation of the wheel; and a winch being attached to one of the flat bars between the handles of the frame, the winch having a cable being wrapped around a winch drum, the cable having a J-hook at an end, the J-hook allowing game to be hauled into the carriage, by the winch, for transporting game out of the wilderness.

2. The game hauling cart comprising:

a frame having a first side portion, a second side portion and a middle portion, the first side portion of the frame having a first pair of handles with a first flat bar therebetween, the second side portion having a second pair of handles with a second flat bar therebetween, the middle portion having three flat bars proportionately space and forming a frame base;

a wheel being rotatably mounted on a hub body and having shaft portion;

a pair of uprights with each upright having a wheel end and a frame end, the wheel end of each upright being capable of receiving the shaft therethrough, the frame end of each upright being welded to a lower side of one of the flat bars of the frame base;

a pair of braces with each brace having a bottom end welded to one of the uprights and a pair of arms extending upward therefrom, each of the arms of each brace being welded to the lower side of one of the three flat bars of the base frame;

a rigid mesh being positionable within the frame and capable of transforming the frame into a symmetrical carriage structure; and a winch being attached to one of the flat bars between the handles of the frame for allowing game to be hauled into the carriage by the winch.

3. The game hauling cart as set forth in claim 2 wherein the frame being generally U-shaped with the middle portion being in a horizontal plane below the first and second portion.

4. The game hauling cart as set forth in claim 2 wherein the shaft portion of the wheel extending therethrough the hub body, and having a pair of threaded ends for allowing it to be locked within the uprights by a hex nut at each end of the shaft.

5. The game hauling cart as set forth in claim 4 wherein the frame end of each upright being welded to a central flat bar of the middle portion for allowing the wheel to support the frame above a receiving surface for movement along the receiving surface.

6. The game hauling cart as set forth in claim 5 wherein the braces being V-shaped and having a top end on each arm, and the top end being welded to the lower side of one of the three flat bars being spaced from the central flat bar, the V-shaped braces adding support for the wheel supporting the frame.

7. The game hauling cart as set forth in claim 2 wherein the mesh being welded to the first side portion, the second side portion and the frame base along an upper side of the frame.

8. The game hauling cart as set forth in claim 2 one of the handles of the frame having a hand break mechanism being attached thereto, the hand break mechanism having a break cable extending downwardly toward a catch device, the catch device being coupled to the shaft of the wheel between one of the uprights and a hub body of the wheel, the hand break mechanism being capable stopping the rotation of the wheel.

9. The game hauling cart as set forth in claim 2 the winch having a cable being wrapped around a winch drum, the cable having a J-hook at an end for pulling the game into the carriage for allowing transportation of the game out of the wilderness.

* * * * *